Aug. 17, 1948.  D. E. MEITZLER  2,447,352
AUTOMATIC TIMING CONTROL FOR FREE PISTON UNITS
Filed Aug. 23, 1944  4 Sheets-Sheet 1

INVENTOR
Donald E. Meitzler

Aug. 17, 1948.     D. E. MEITZLER     2,447,352
AUTOMATIC TIMING CONTROL FOR FREE PISTON UNITS
Filed Aug. 23, 1944     4 Sheets-Sheet 3

TO TIMING CONTROL

INVENTOR
Donald E. Meitzler

INVENTOR
Donald E. Meitzler

Patented Aug. 17, 1948

2,447,352

UNITED STATES PATENT OFFICE 2,447,352

AUTOMATIC TIMING CONTROL FOR FREE PISTON UNITS

Donald E. Meitzler, Manchester, Conn., assignor to United Aircraft Corporation, East Hartford, Conn., a corporation of Delaware Application August 23, 1944, Serial No. 550,897

7 Claims. (Cl. 123—46)

This invention relates to the automatic timing of the fuel injection in free-piston units.

When the injection device is actuated in response to piston movement, as by a cam on the restraining linkage, the injection is independent of the position at the inner end of its stroke, and the injection may occur too early or too late. A feature of this invention is a control of the injection with respect to the location of the end of the piston stroke, so that the injection may occur at the proper time on each piston stroke.

An object of this invention is to control the timing of the fuel injection so that it will occur at the desired time on each stroke independently of the length or position of the stroke.

As the quantity of fuel injected into the engine cylinder varies, length and position of the stroke of the piston also varies, thus changing the position of the piston at the end of the compression stroke. A feature of this invention is a timing control which adjusts the timing in accordance with changes in the position of the piston at the end of the compression stroke.

A feature of the invention is a control for automatically adjusting the timing in readiness for starting the unit.

Other objects and advantages will be apparent from the specification and claims, and from the accompanying drawings which illustrate an embodiment of the invention.

Figure 1:
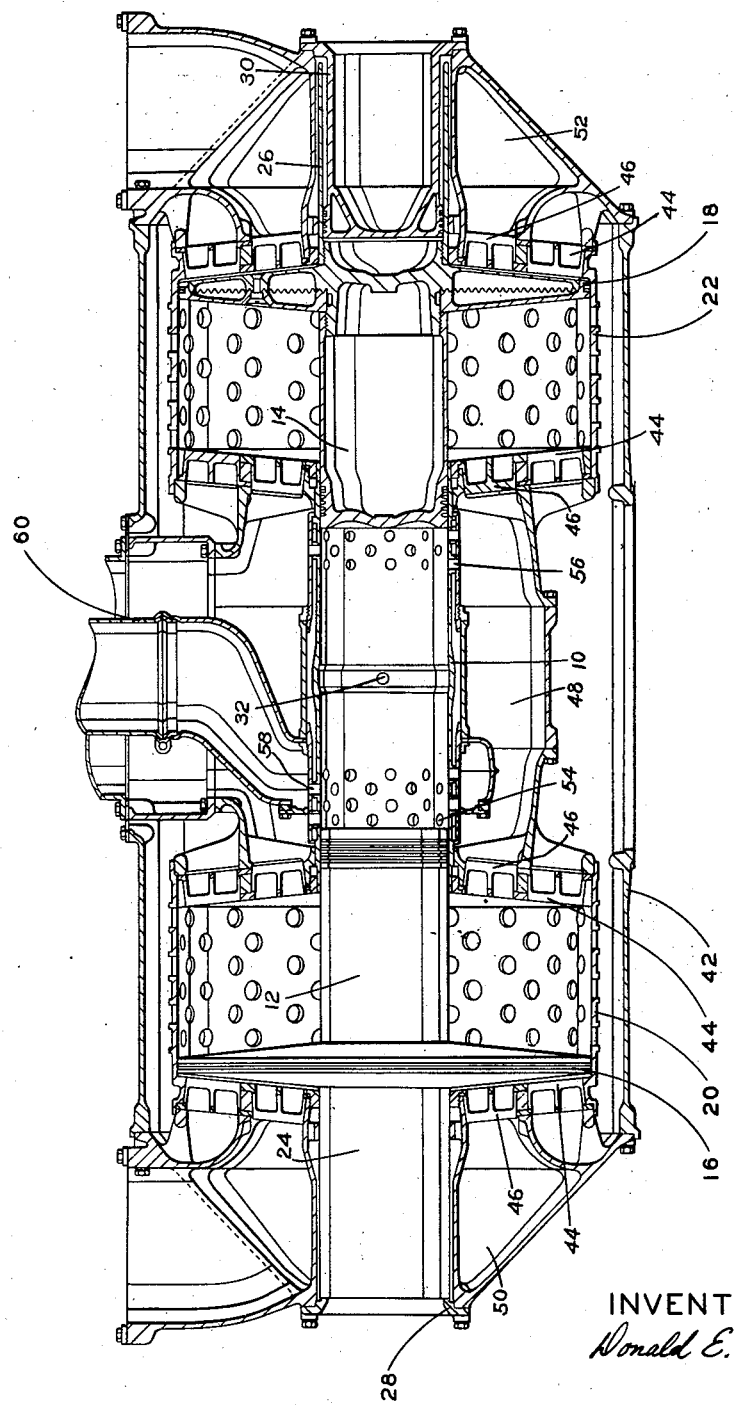
Fig. 1 is a sectional view through the free-piston unit.

The unit shown includes an engine cylinder 10 having reciprocating pistons 12 and 14 to which compressor pistons 16 and 18 in cylinders 20 and 22 are integrally connected. Sleeves 24 and 26 attached to the compressor pistons complete the reciprocating piston assemblies. The sleeves in combination with stationary pistons 28 and 30 form air spring cylinders.

The piston assemblies are moved apart by the burning of fuel injected into engine cylinder 10 through one or more nozzles 32. Air compressed in the air spring cylinders on the power stroke returns the piston assemblies. The assemblies are always maintained at equal distances from the center of the engine cylinder by a linkage which may include racks 34 and 36, Fig. 2, extending from the piston assemblies and meshing with a pinion 38 on a shaft 40.

Intake manifold 42, which extends around the compressor and engine cylinders, conducts air to intake valves in the heads of the compressor cylinders through which air alternately enters opposite ends of the compressor cylinders. The compressed air leaves the cylinders through discharge valves 46, also at opposite ends of the compressor cylinders and passes into a central scavenge chamber 48 and end chambers 50 and 52. These chambers may be interconnected by a scavenge manifold, not shown.

Compressed gas from the scavenge chambers enters engine ports 54 and 56 which are uncovered by pistons 12 and 14 at the end of the power stroke, thereby permitting air to be blown through the engine cylinder. Gas in the engine cylinder is discharged through exhaust ports 58 into exhaust manifold 60.

Figure 2:
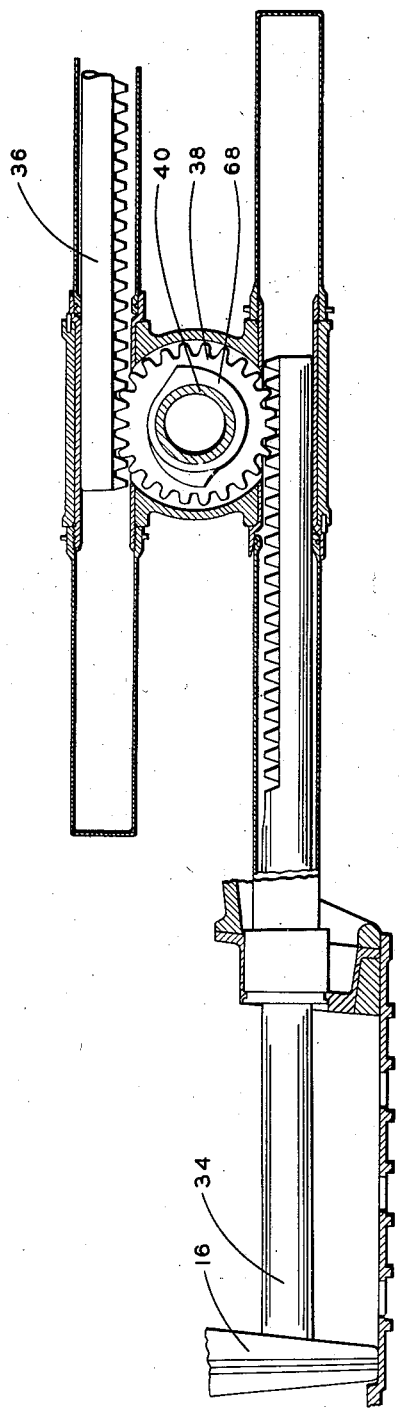
Fig. 2 is a fragmentary sectional view through the restraining linkage.
Figure 3:
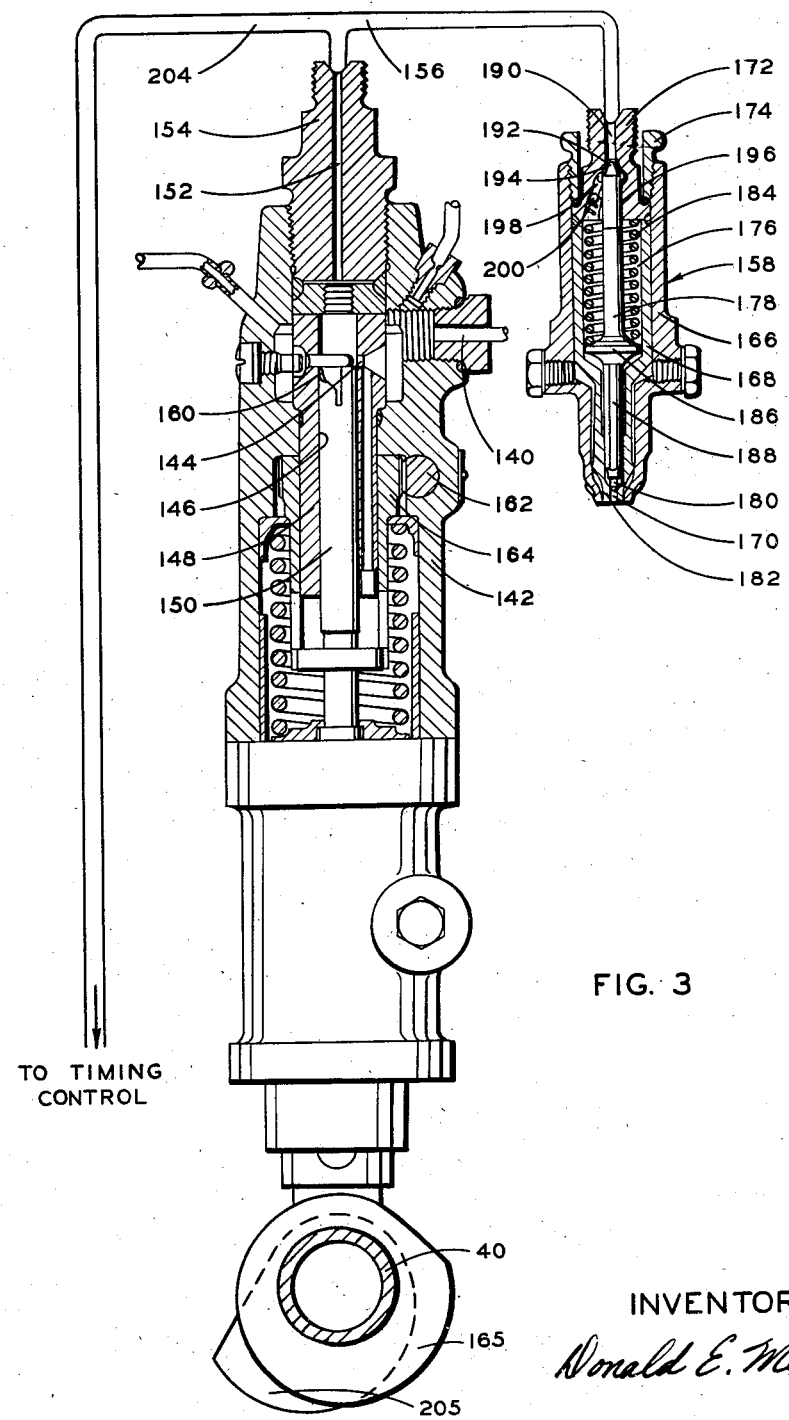
Fig. 3 is a sectional view through the injection pump and nozzle.

The positions of the pistons at the inner ends of their strokes are indicated by an inner master control 62 showing the location of the inner end of the stroke and an outer master control 64 which indicates the outer end of the stroke. These controls are actuated by cams 66 and 68 turning with the pinion 38 as shown in Fig. 2. Since the pinion 38 is oscillated directly from the pistons, the movement of cams 66 and 68 is proportional to the piston stroke. The master controls are identical and a description of the outer master control will suffice for both.

Fluid under pressure from a constant pressure source enters a passage 70 in a casing 72 through a conduit 74. This passage intersects a bore 76 adjacent its outer end and a throttling screw 78 controls the rate of flow into bore 76. A branch passage 80 from passage 70 connects with a port 82 in bore 76. A plunger 84 in bore 76 has a groove 86 which connects a port 88 alternately with port 82 or with a port 90. Port 88 is connected by a passage 92 to the inner end of bore 76. Port 90 is connected by a channel 94 in casing 72 and in an adjacent casing 96 to the inner (left hand) end of a bore 98 in casing 96.

A piston in bore 98 is moved to the right by a calibrated spring 102. A plunger 104 extends through the piston and carries on its projecting outer end a push rod 108. This rod has a roller 110 held against cam 66 by a spring 112. Plunger 104 has a central passage 114 connected with spaced grooves 116 and 118 in the plunger. Groove 116 aligns with openings 120 in a sleeve 122 carried by piston 100, and groove 118 is adapted to be uncovered by the end of sleeve 122 as the plunger is moved to the right by the cam as the pistons approach the outer ends of their strokes.

Fluid under pressure from the right hand end of bore 76 enters the right hand end of bore 98 through a connecting channel 124, moving piston 100 to the left against the spring 98. As plunger 104 is moved to the right by cam 68 the groove 118 is uncovered by sleeve 122 to permit discharge of fluid from the right hand end of bore 98. The pressure in the right hand end of bore 98 varies in accordance with the compression of the spring, and, as the piston stroke becomes shorter, the piston 100 moves inward increasing the spring tension and increasing the pressure at the end of bore 98.

Since the change in pressure on the right hand end of plunger 84 is proportional to the change in the location of the end position of the piston stroke, the pressure on the inner (left hand) end of plunger 84, which balances the pressure on the outer end, must vary in the same manner. In this way the pressure in the discharge conduit 126 is proportional to the spacing of the actual end of the piston stroke from the extreme outer position of the piston, and changes in pressure in this conduit will be proportional to changes in the outer end position of the piston stroke. This pressure and change in pressure may indicate on a gauge 128 the exact position of the end of the piston stroke and may be used for controlling the adjusting means which are used for varying the operating characteristics of the unit.

The outer end of plunger 104 may reciprocate in a chamber 130 having an outlet conduit 132 connected to a sump, not shown. The inner end of bore 98 may be connected by a conduit 134 to the conduit 132. The inner master control operates in a similar way and controls the pressure in discharge conduit 136 in proportion to the spacing of the actual inner end of the piston stroke from the extreme inner end position. A bellows 138 for the inner master control and a similar bellows, not shown, for the outer master control may minimize surges in the controls.

The inner master control is used in adjusting the timing of the fuel injection system. This system is shown as the accumulator type of fuel injection system, one example of which is described in the copending application of Meitzler, Serial No. 486,623, filed May 11, 1943, now Patent #2,405,043, July 30, 1946. For the purpose of this application, it is sufficient to note that fuel under pressure entering a port 140 in a casing 142 passes through a filling port 144 into the end of a bore 146 in a casing 148 in which a plunger 150 reciprocates. The end of this bore communicates through a passage 152 in a cap 154 and a conduit 156 with the injection nozzle 158.

Pump plunger 150 has a helical shoulder 160 which by covering port 144 controls the quantity of fuel delivered to the injection nozzle for each injection. The quantity may be adjusted by turning the plunger angularly by means of a rack 162 engaging a pinion 164 having a sliding connection with the plunger. The plunger may be reciprocated from a cam 165 on the same shaft 40 as cams 66 and 68, the plunger moving upward during the compression stroke of the engine pistons.

The injection nozzle 158 includes a housing 166 having a portion adapted to engage a bore in the wall of the engine cylinder. A sleeve 168 fits within the hollow housing and at the inner end is reduced in diameter to define a delivery port 170 through which fuel is discharged into the engine cylinder. A cap 172 engages the opposite end of sleeve 168 and is clamped within housing 166 by a threaded ring 174. Sleeve 168 forms an accumulator chamber 176 in which fuel is accumulated under pressure in readiness for injection.

Within chamber 176 is an accumulator valve including a plunger 178 having a valve element 180 at one end engaging a valve seat 182 in sleeve 166 for closing delivery port 170. This plunger is normally held against seat 182 by a coil spring 184 surrounding the plunger and extending between a flange 186 on the plunger and cap 172. Plunger 178 is slidable within sleeve 168 and has a groove 188 to permit a flow of fuel from chamber 176 to discharge port 170.

An inlet passage 190 in cap 172 has a concentric valve seat 192 engaged by a valve element 194 on the end of plunger 178 remote from valve element 180. Between seat 192 and the accumulator chamber, cap 172 has a bore 196 forming a continuation of passage 190 and in which the end of plunger 178 is guided. A by-pass channel 198 in cap 172 permits the flow of fuel from passage 190 into the accumulator chamber. Channel 198 has a check valve 200 to prevent escape of fluid from chamber 176.

During delivery of fuel under pressure to the accumulator chamber, the pressure acting on valve element 194 assists spring 184 in holding the plunger against seat 182. Upon a drop in pressure in passage 190, the pressure within the accumulator chamber causes the plunger to move endwise to engage seat 192 and to open delivery port 170 for injection of fuel from the chamber into the engine cylinder.

An automatic timing device 202 which is responsive to the pressure from the inner master control is connected by a conduit 204 to conduit 156 for causing the drop in pressure in this line at the desired time for fuel injection into the engine cylinder. The automatic timing device may be actuated by a cam 205 on the same shaft 40 as cam 165.

Figure 4:
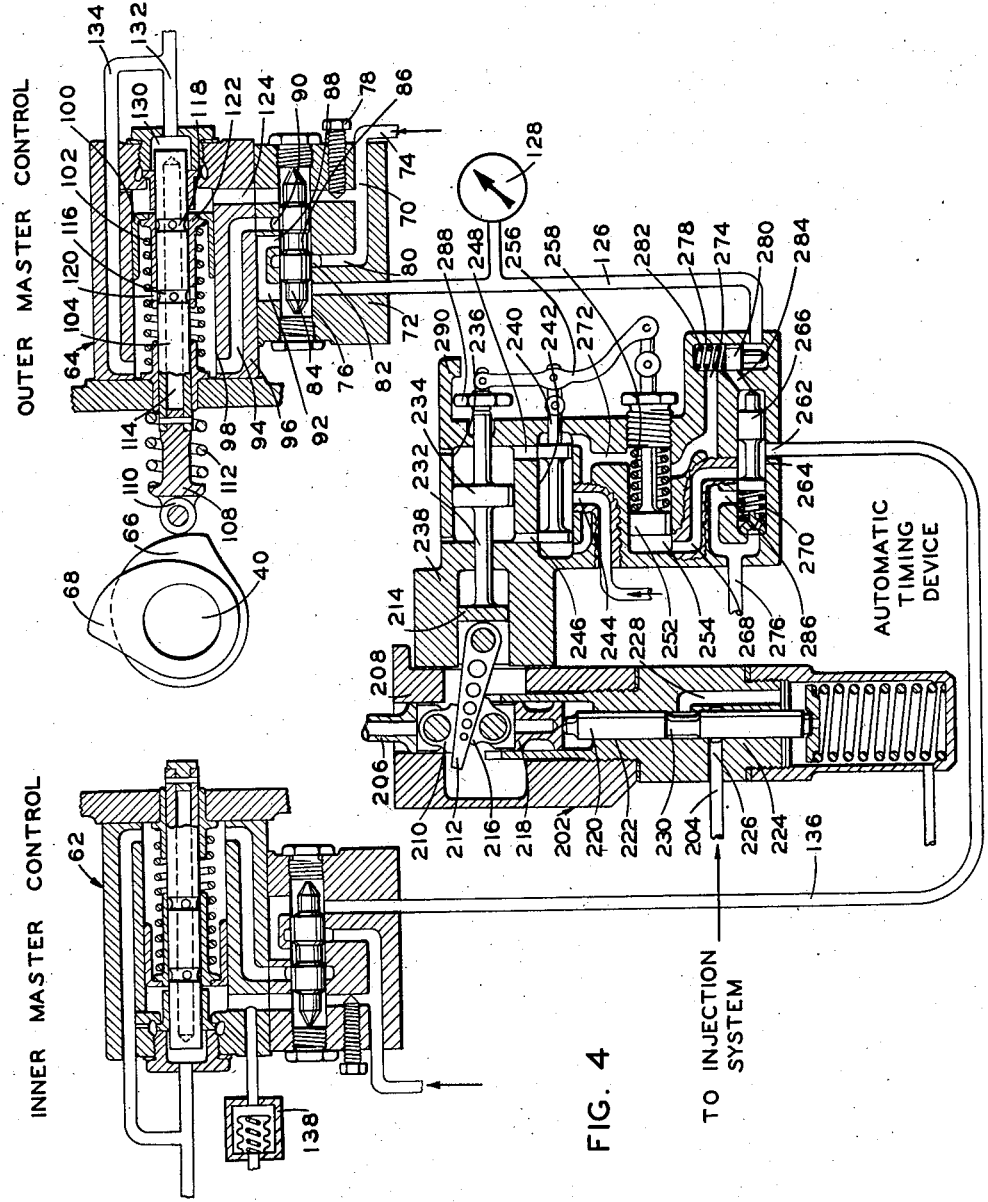
Fig. 4 is a diagrammatic view of the fuel timing device and the master controls.

Cam 205 engages a follower, not shown, on the end of a rod 206, Fig. 4, reciprocating in a housing 208. The lower end of rod 206 carries a bearing shoe 210 engaging with a wedge 212 pivoted on a block 214. The other side of the wedge shaped cam 212 engages a bearing shoe 216 on the end of a reciprocating rod 218.

The lower end of rod 218 engages plunger 220 reciprocating in a bore 222 in a casing 224 mounted on housing 208. This casing has an inlet port 226 connected to conduit 204. A discharge port 228 in casing 224 is in a position to be connected with said port by a groove 230 in the plunger as the latter is moved downward during the compression stroke of the engine pistons. Venting of conduit 226 when ports 224 and 288 are connected causes injection of fuel by a drop in pressure in conduit 204.

The point at which injection takes place is adjusted by endwise movement of wedge 212 between the bearing shoes and this is accomplished by means of a servo-motor. As shown, block 214 is mounted on a piston rod 232 extending from a piston 234 in a bore 236 in a housing 238. Fluid under pressure from a constant pressure source is alternately directed to opposite ends of bore 236 by a sliding valve 240 in a parallel bore 242. Fluid under pressure enters bore 242 through a centrally located port 244 and is directed selectively to either end of bore 236 through ports 246 and 248 extending between the bores. Valve 240 has a central groove which alternately establishes fluid connection between the inlet port 244 and the ports 246 and 248.

The position of valve 240 is controlled by a plunger 252 in a bore 254 also in housing 238. This plunger has a projecting rod connected to one end of a lever 256, the other end of which is pivoted on the end of a rod extending from plunger 234. Lever 256 is also connected between its ends to a projecting stem on valve 240 so that movement of plunger 252 in either direction causes a corresponding but shorter movement of the valve 240.

Plunger 252 is normally moved to the right by fluid pressure from the inner master control entering the left hand end of the bore and moving the plunger against the action of a spring 258. As the pressure from the inner master control increases, indicating that the actual inner end of the piston stroke is moving away from inner dead center, the wedge 212 is moved to the left to cause uncovering of port 226 and thereby to cause injection of fuel at a point farther from inner dead center. Conversely, as the actual inner end of the piston stroke approaches inner dead center the injection occurs at a point nearer to inner dead center by movement of wedge 212 to the right.

As shown, conduit 136 connects the pressure delivery port of the inner master control to a port 262 in housing 238. This port intersects a bore 264 in which a valve plunger 266 is slidable. This valve has a groove normally connecting port 262 to a passage 268 from this bore to the left hand end of bore 254. Plunger 266 is normally held in the position shown by a spring 270.

During normal operation, a channel 272 connects the ends of bore 242 to the right hand end of bore 254 and other channels 274 connect the right hand end of this bore and the left hand end of bore 264 to a vent conduit 276. The timing device is thus responsive to changes in the pressure from the inner master control, so that the injection occurs in predetermined relation to the actual inner end of the piston stroke.

This device may operate under substantial variations in atmospheric pressure, especially when used in an aircraft power plant. The operation of the device will not be adjusted by atmospheric changes and no altitude compensation will be necessary, since both the automatic timing device and the master controls are vented to atmospheric pressure. That is, conduits 132 and 134 vent the master control, and conduit 276 with the connecting passages in casing 238 vent the timing device.

In starting the unit, the piston assemblies are moved to starting positions spaced from the inner dead center positions. This results in a high pressure from the inner master control which would normally advance the timing as far as possible. If this is undesirable, the outer master control may be used to set the timing for starting.

For this purpose, conduit 126 from the outer master control, connects with the lower end of a bore 278 for a plunger 280. This plunger, which acts as a relay, is normally held in the position shown by a spring 282 and is moved against the pressure of this spring when the outer master control pressure reaches the high value resulting from the starting position of the piston. Plunger 280 uncovers a passage 284 from bore 278 to the right hand end of bore 264. Pressure entering the end of bore 264 moves plunger 266 to the left and connects channel 268 with a vent channel 286, thereby dropping the pressure at the left hand end of plunger 252 and causing wedge 212 to be withdrawn to its extreme right hand position, as determined by a nut 288 on rod 232 engaging a projecting lug 290 on housing 238. After the unit starts and the outer master control pressure is reduced, the plungers 266 and 280 return to the positions shown and the injection timing is then adjusted by the inner master control.

It is to be understood that the invention is not limited to the specific embodiment herein illustrated and described, but may be used in other ways without departure from its spirit as defined by the following claims:

I claim:
1. A free-piston unit including a cylinder, a piston reciprocating in the cylinder and having a variable length of stroke, and means for injecting fuel into the cylinder, in combination with means for automatically adjusting said fuel injecting means for controlling the time of the injection of fuel with respect to the end position of the piston stroke, said adjusting means being responsive to changes in the end positions of successive strokes.

2. A free-piston unit including a cylinder, a piston reciprocating in the cylinder and having a variable length of stroke, and means for injecting fuel into the cylinder, in combination with means associated with said injecting means and responsive to changes in the end position of the piston stroke for automatically adjusting said fuel injecting means for controlling the time of the injection of fuel with respect to the end of the piston stroke.

3. A free-piston unit including a cylinder, a piston reciprocating in the cylinder and having a variable length of stroke, and means for injecting fuel into the cylinder, in combination with means for automatically causing injection of fuel by said means when the piston is at a predetermined distance from the end of the compression stroke, said last means including a device responsive to changes in the inner end positions of the piston strokes and means responsive to said device for adjusting said fuel injecting means.

4. A free-piston unit including a cylinder, a piston reciprocating in the cylinder and having a variable length of stroke, and means for injecting fuel into the cylinder, in combination with means for adjusting said fuel injecting means for controlling the time of injection, said adjusting means being responsive to changes in the end position of the compression stroke of the piston.

5. A free-piston unit including a cylinder, a piston reciprocating in the cylinder and having a variable length of stroke, and means for injecting fuel into the cylinder, including an injection plunger reciprocated in response to piston movement, in combination with means for procuring injection by said means independently of the position of the plunger, and means for adjusting said procuring means in response to changes in the end position of the piston strokes.

6. A free-piston unit including a cylinder, a piston in the cylinder and having a variable length of stroke, and accumulator injection means for injecting fuel into said cylinder, in combination with means for timing the injection of fuel by said means with respect to the end position of the piston at the end of the compression stroke, said timing means including a device responsive to changes in the end positions of the piston strokes, and means actuated by said device for adjusting the timing of the fuel injection by said injection means.

7. A free-piston unit including a cylinder, a piston in the cylinder and having a variable length of stroke, and accumulator injection means for injecting fuel into said cylinder, including a plunger adapted to pump fuel into an accumulator chamber, a nozzle, and a valve movable in response to a drop in pressure between said chamber and plunger to connect said chamber to the nozzle for injection of fuel, in combination with means responsive to changes in the end position of the compression stroke of the piston for procuring said drop in pressure independently of the position of the plunger.

DONALD E. MEITZLER.

REFERENCES CITED

The following references are of record in the file of this patent:

UNITED STATES PATENTS

| Number | Name | Date |
|---|---|---|
| 2,178,311 | Pescara | Oct. 31, 1939 |

FOREIGN PATENTS

| Number | Country | Date |
|---|---|---|
| 210,884 | Switzerland | Aug. 15, 1940 |
| 509,111 | Great Britain | July 11, 1939 |